(12) United States Patent
Kaestner

(10) Patent No.: US 9,715,271 B2
(45) Date of Patent: Jul. 25, 2017

(54) USB POWER PORT CONTROL

(71) Applicant: Microchip Technology Incorporated, Chandler, AZ (US)

(72) Inventor: Clemens Kaestner, Rosenheim (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 62 days.

(21) Appl. No.: 14/701,854

(22) Filed: May 1, 2015

(65) Prior Publication Data

US 2015/0323979 A1 Nov. 12, 2015

Related U.S. Application Data

(60) Provisional application No. 61/989,112, filed on May 6, 2014.

(51) Int. Cl.
*G06F 1/32* (2006.01)
*G06F 1/26* (2006.01)
*G06F 1/28* (2006.01)

(52) U.S. Cl.
CPC .......... *G06F 1/3287* (2013.01); *G06F 1/266* (2013.01); *G06F 1/28* (2013.01); *G06F 1/3253* (2013.01)

(58) Field of Classification Search
CPC .. G06F 1/266; G06F 13/4022; G06F 13/4081; G06F 13/4282; G06F 1/3215; G06F 1/26; H02J 7/0036; H02J 7/34; Y10T 307/438
See application file for complete search history.

(56) References Cited

U.S. PATENT DOCUMENTS 4,004,201 A * 1/1977 DePuy .................. H02H 3/105
340/638
6,000,042 A * 12/1999 Henrie ...................... G06F 1/26
713/340

(Continued)

OTHER PUBLICATIONS

Semig, Pete, and Collin Wells. "A Current Sensing Tutorial—Part 1: Fundamentals | EE Times." EETimes. Aspencore's Media Brands, Feb. 8, 2012. Web. Aug. 23, 2016. <http://www.eetimes.com/document.asp?doc_id=1279404>.*

(Continued)

*Primary Examiner* — Jaweed A Abbaszadeh
*Assistant Examiner* — Brian J Corcoran
(74) *Attorney, Agent, or Firm* — Slayden Grubert Beard PLLC

(57) ABSTRACT

A system, method and device for providing over-current protection to USB ports comprised in a USB hub, whereby a single switch is used to control the power supply to one or more groups of USB ports based on determinations whether the current drawn by a group of USB ports has exceeded a predefined current limit. Embodiments provide the cost savings associated with gang mode power port switching and the reduced stress on USB components and individualized protection of USB ports associated with individual mode power switching. Embodiments utilize a plurality of current measurement units to measure the current drawn by each group of USB ports supported by a switch and further utilize a power port control logic unit to control the switch based on whether the current measurements have exceeded a current limit.

8 Claims, 2 Drawing Sheets

(56) References Cited

U.S. PATENT DOCUMENTS

| | | | |
|---|---|---|---|
| 6,222,716 B1* | 4/2001 | Chiang | H02H 1/04 307/125 |
| 6,541,879 B1 | 4/2003 | Wright | 307/31 |
| 7,525,291 B1* | 4/2009 | Ferguson | H02J 7/0021 320/128 |
| 9,229,514 B2* | 1/2016 | Humphrey | G06F 1/28 |
| 2002/0002593 A1* | 1/2002 | Ewing | G06F 1/26 709/212 |
| 2006/0117195 A1* | 6/2006 | Niwa | G06F 1/266 713/300 |
| 2007/0035271 A1* | 2/2007 | Quirion | H02M 1/32 318/801 |
| 2008/0019068 A1* | 1/2008 | Reynolds | G06F 1/26 361/93.1 |
| 2008/0249666 A1* | 10/2008 | Buterbaugh | G06F 1/28 700/293 |
| 2009/0100275 A1* | 4/2009 | Chang | G06F 1/266 713/300 |
| 2010/0235655 A1* | 9/2010 | Tauscher | G06F 1/266 713/300 |
| 2011/0018344 A1* | 1/2011 | Liao | G06F 1/266 307/31 |
| 2011/0298576 A1* | 12/2011 | Baujan | H01H 71/122 337/5 |
| 2012/0080940 A1* | 4/2012 | Larsen | H02J 1/14 307/12 |
| 2012/0198119 A1* | 8/2012 | Johnson | G06F 13/4022 710/312 |
| 2013/0132758 A1 | 5/2013 | Shiba | 713/340 |
| 2013/0166937 A1 | 6/2013 | Tu et al. | 713/340 |
| 2014/0129856 A1* | 5/2014 | Bertin | G06F 1/325 713/320 |

OTHER PUBLICATIONS

Lynn, Kevin, "Universal Serial Bus (USB) Power Management," Micrel Semiconductor, IEEE, pp. 434-441 (8 pages), Nov. 4, 1997.
"MIC2526 Dual USB Power Control Switch," Micrel, http://www.micrel.com/_PDF/mic2526.pdf, 12 pages, Jan. 1, 2000.
International Search Report and Written Opinion, Application No. PCT/US2015/028878, 12 pages, Aug. 6, 2015.

* cited by examiner

USB POWER PORT CONTROL

CROSS-REFERENCE TO RELATED APPLICATIONS

This application claims the benefit of U.S. Provisional Application No. 61/989,112 filed on May 6, 2014, which is incorporated herein in its entirety.

TECHNICAL FIELD

The present disclosure relates to universal serial bus (USB) technology, in particular power switches for providing over-current protection on USB ports comprised in a USB hub.

BACKGROUND OF THE INVENTION

The Universal Serial Bus (USB) standard was developed to provide personal computer users with a single hardware and software interface for connecting a wide range of peripherals to desktop and laptop computers. USB has become the interface of choice for peripheral devices because it offers simple connectivity and a standardized interface that has proven effective for communicating with a vast array of peripheral devices. In addition to providing a standardized interface for communications between a peripheral device and a host device, USB provides the ability to transfer power bi-directionally via a USB connection.

Building on advances in battery technology, peripheral devices powered at least in part by internal, rechargeable batteries have become common in the marketplace. USB has become a popular mechanism for charging these battery-powered peripheral devices. For many peripheral devices, USB is the sole interface provided for charging the peripheral's internal batteries. Some USB peripheral devices have no internal batteries and rely strictly on the power provided via a USB connection in order to operate.

From a hardware perspective, host devices commonly provide a USB interface via a hub that typically has two or more USB ports. In general, a USB hub multiplies the number of USB ports that can be supported by a host device. Each of the USB ports supported by a hub is a "power port" that, in additional to supporting data transfers, also provides the capability of powering and/or charging a connected USB peripheral device. Certain USB ports are configured as dedicated charging ports that do not support data transfers and are strictly used for transferring power, making these ports especially adapted for charging the batteries of a peripheral USB device. Certain hubs include an internal power supply and are thus "self-powered." Hubs that are self-powered must include over-current protection in order to limit the possibility of allowing potentially harmful current levels to be drawn by peripheral devices connected to the hub.

In devices compliant with the USB standard, the amount of power that can be transferred via a USB connection is limited according to thresholds set forth in the USB specification and its revisions. In the first version of the USB standard, the amount of current that could be transferred via a USB connection was limited to 500 mA. This current limit for USB connection was later increased to 900 mA and then to 1.5 A. The current limit for USB charging ports has recently been increased to 5 A. In some cases, the maximum available current may be provided by a USB hub as soon as a peripheral device is connected to one of its USB ports. In most instances, however, enumeration of the peripheral device by the host device determines the appropriate current level that should be provided by the USB hub. The USB hardware of the host device must be capable of supporting these various current limit settings and providing a regulated supply of power that stays below the threshold current limit that is applicable for a USB port at any given time.

USB hubs implement power switching circuitry that is configured to enforce the applicable current limits on the USB ports that are supported by a hub. In general, power switching turns off the power supplied to a USB port when the current drawn by a peripheral device connected to the USB port exceeds a current limit. Two different mechanisms may be used by USB hubs to implement power switching.

Individual mode power switching implements a dedicated power switching mechanism for each USB port. Each USB port has an individual power switching mechanism that measures the current drawn by a peripheral device connected to the USB port and shuts off power provided by the port's USB connection if the measured current draw exceeds the current limit that is being enforced for this port.

The second power switching mechanism is gang mode power switching, where the USB hub regulates and controls power to a group of USB ports on a collective basis. In ganged mode power switching, the USB hub measures the total current that is collectively drawn by the peripheral devices connected to the ganged USB ports. If the measured, aggregate current drawn by the ganged USB ports exceeds the current limit being enforced, the USB hub shuts off power to all of the ganged USB ports.

With regards to the cost required to implement over current protection, gang mode power switching is preferable to individual mode switching since implementing a gang mode power switch requires only a single power switch and a single current sensing component that measures the current being drawn by all ports, while individual mode requires a separate power switch and current sensing component for every USB port. Despite the cost savings provided by gang mode power switching, as USB charging ports become more prevalent and the current limits being supported by USB ports increase, gang mode power switches place greater demands on the USB connectors used to deliver this power.

In particular, implementing gang mode power switching requires that the USB connectors that comprise each of the USB ports withstand currents up to the current limit being enforced by the single power switch and current sensing component. Since the current limit used by a gang mode power switch will typically be compared to the sum of the current draws on all of the supported USB ports, this current limit is typically set as high as possible in order to support simultaneous current draws on the supported USB ports. Moreover, the current limits that must be supported by USB power port switches have gradually increased as the current draws supported by USB have been increased. However, many USB connectors presently being sold were originally designed for use at the lower current levels in use prior to changes in the USB standard. As a result, USB connector components used in gang mode power switches may be exposed to current levels that exceed the current ratings for the USB connectors, thus stressing these components and increasing malfunctions and failures.

Individual power mode switching places less stress on the USB connectors since each USB port has a dedicated power switch and current sensing unit that is configured to protect an individual USB port. This allows the current limit settings in individual mode power switches to be set according to the current rating of the connector hardware of the individual USB port being protected and the properties of the peripheral device connected to the USB port, without concern for providing sufficient current for multiple USB ports to operate concurrently. Thus, there exists a need for USB power switching that can provide the costs benefits of gang mode power switching while providing the reduced stress on USB connectors and individualized protection that is provided by individual mode power switching.

SUMMARY OF THE INVENTION

Conventional power switches must choose between the advantages and disadvantages of individual mode power switching and ganged mode power switching. Hence, there is a need for a power switch that can provide certain of benefits provided by both modes of power switching. This is achieved through embodiments of the present invention.

According to an embodiment, a USB hub includes a plurality of USB ports, a power element for providing a supply of current to the plurality of USB ports, a plurality of current measurement units and a power port control logic unit. The plurality of current measurement units measure the current drawn by a USB port sub-group. A USB port sub-group is comprised of one or more of the plurality of USB ports. The power port control logic unit is configured to control the power element. The power port control logic unit receives one or more current measurements from the plurality of current measurement units and is configured to direct the power element to turn off the supply of current to the plurality of USB ports if the received current measurements indicate a current limit has been exceeded by one or more of the USB port sub-groups.

According to further embodiments, the power element is a power switch or a controllable power supply. According to further embodiments, each of the current measurement units comprises a shunt resistor and a current sensing unit. Further embodiments include a plurality of registers, wherein each of the plurality of registers stores a current limit for each USB port sub-group. Further embodiments include a comparator configured to retrieve one or more current limits from the plurality of registers and further configured to determine whether one or more of the current measurements exceed one or more of the retrieved current limits. According to further embodiments, the current measurement unit comprises an analog-to-digital converter. According to further embodiments, the power port control logic unit is further configured to sum the received current measurements to determine the aggregate current drawn by all USB port sub-groups and the power port control logic unit is further configured to determine if the aggregate current drawn by all USB port sub-groups exceeds a current limit.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms.

Figure 1:
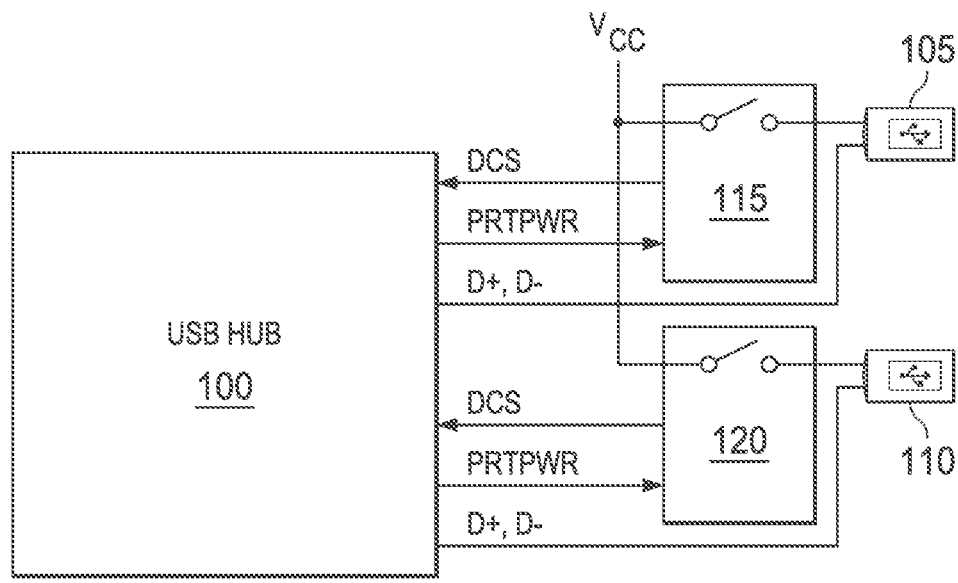
FIG. 1 is a schematic diagram illustrating the components of a conventional individual mode power switch

FIG. 1 illustrates a conventional implementation of individual mode power switching. In the power switch implementation of FIG. 1, USB hub 100 provides USB connectivity with peripheral devices via two USB ports, 105 and 110. On behalf a host device, USB hub 100 supports data and power transfers between the host device and peripheral USB devices via USB ports 105 and 110. Data transfers are supported using individual pairs of D+ and D− lines that support USB connections at each of the USB ports 105 and 110. Power transfers via the USB ports 105 and 110 are supported by power switches 115 and 120. The USB hub 100 independently enables power transfers by USB ports 105 and 110 by signaling the respective power switches 115 and 120 via PRTPWR signal lines. As an individual mode power switching implementation, each of the USB ports illustrated in FIG. 1 has a dedicated power switch, allowing power transfers by each USB port to be independently controlled by USB hub 100. In addition to supplying the USB ports 105 and 110 with power, power switches 115 and 120 respectively protect USB ports 105 and 110, and the peripheral devices connected to those ports, from over-current conditions that could potentially damage circuitry in the peripheral devices or the host device.

In providing individual current protection to each of the USB ports 105 and 110, both power switch 115 and power switch 120 include over-current sensing circuitry that measures the current drawn by a USB port and determines whether the measured current draw exceeds a predetermined current limit for that USB port. As an individual mode power switch implementation, each power switch 115 and 120 operates independently. If the current sensing circuitry of power switch 115 detects a current draw by a peripheral device connected to USB port 105 that exceeds the current limit for that port, power switch 115 turns off power to USB port 105. Upon detecting an over-current condition and switching off power to a USB port, each power switch signals this condition back to USB hub 100 via an Over Current Sensing (OCS) signal line. Current limits for USB ports 105 and 110 may be individually determined based on enumeration of the peripheral devices connected to each USB port. This ability to individually tailor current limit protection to each USB port based on the properties of the peripheral device connected to the port is a key benefit provided by individual mode power switching. However, as described above, this benefit comes at the cost required to include power switching and current sensing hardware for each USB port.

Figure 2:
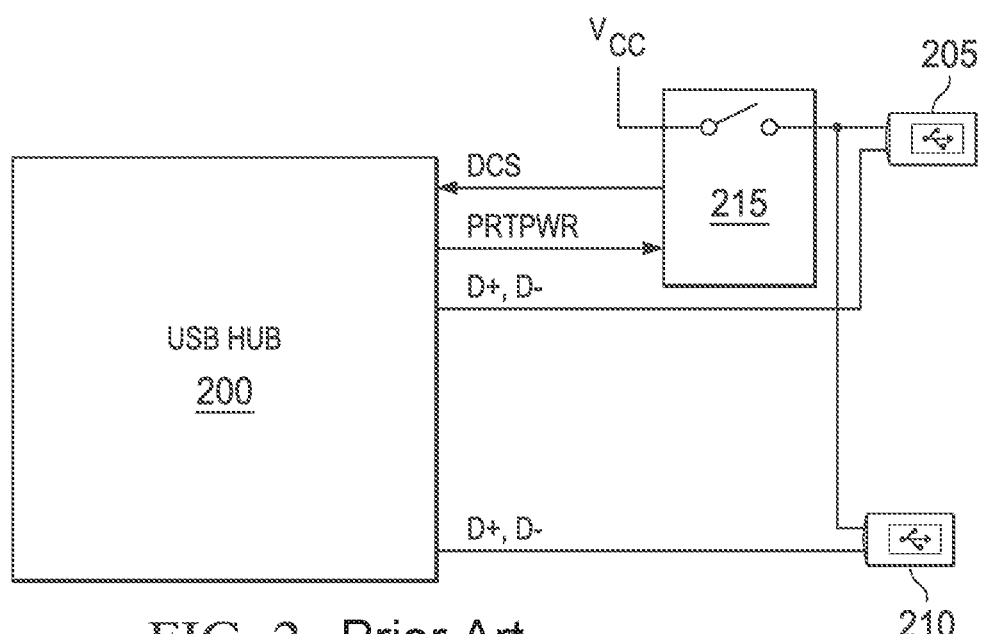
FIG. 2 is a schematic diagram illustrating the components of a conventional gang mode power switch.

FIG. 2 illustrates a conventional implementation of gang mode power switching. In this power switch implementation, USB hub 200 supports USB connections with peripheral devices via USB ports 205 and 210. As with the individual mode power switching implementation, USB hub 200 supports data and power transfers between a host device and peripheral USB devices via USB ports 205 and 210. The same as for individual mode power switching, data transfers are supported using individual pairs of D+ and D− lines that support USB data transfers at each of the USB ports 205 and 210.

Unlike the individual mode power switch, power transfers via USB ports 105 and 110 are controlled by a single power switch 215 in the gang mode power switch of FIG. 2. USB hub 200 enables power transfers by both USB ports 105 and 110 by signaling the power switch 215 via a PRTPWR signal line. As an implementation of a gang mode power switch, USB ports 105 and 110 share a single power switch and current sensing unit 215. Consequently, power transfers by USB ports 105 and 110 are collectively controlled by the USB hub 100. As with the individual mode power switch of FIG. 1, power switch 215 protects USB ports 205 and 210 and the peripheral devices connected to those ports from over-current conditions that could potentially damage circuitry in the peripheral devices or the host device.

Power switch 215 includes over-current sensing circuitry that measures the total current collectively drawn by USB ports 205 and 210 and determines whether an over-current condition exists on either of these ports. As a gang mode power switch, power switch 215 provides collective over current protection to both USB ports 205 and 210. If the current sensing circuitry of power switch 215 detects a total current draw by USB port 205 and USB port 210 that exceeds a specified current limit, power switch 215 turns off power delivery to both USB port 205 and USB port 210. Upon detecting an over current condition and switching off power to both USB ports 205 and 210, power switch 215 signals this over-current condition back to USB hub 200 via an OCS signal line.

The current limit enforced by power switch 215 on both USB ports 205 and 210 is typically determined based on enumeration of the peripheral devices connected to each of the USB ports. Based on enumeration of all connected peripheral devices, a single current limit that adequately protects all of the peripheral devices may be determined by the USB hub 200. The current limit determined by USB hub 200 is communicated to power switch 215, which enforces this current limit. Unlike an individual mode power switch, the gang mode power switch is unable to individually tailor current limit protection to each USB port. However, by utilizing a single power switch and current sensing unit, the gang mode power switch provides considerable cost savings compared to the individual mode power switch.

Figure 3:
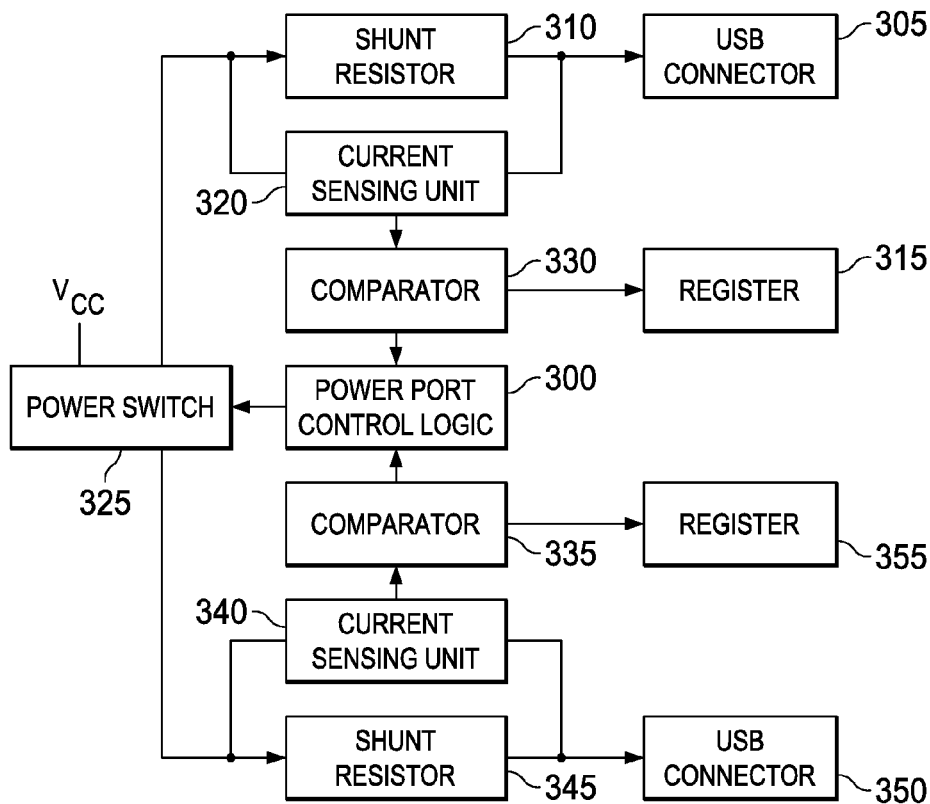
FIG. 3 is a schematic diagram illustrating the components of a power switch embodiment of the claimed invention.

FIG. 3 illustrates an embodiment of a power switch that enables combining individual mode power switching and gang mode power switching in a manner that provides certain benefits provided by each of the two modes of over-current protection. In the embodiment illustrated in FIG. 3, over current protection is provided for USB port 305 and USB port 350 using a single power switch 325. A power port control logic unit 300 controls power switch 325. In some embodiments, the power port control logic unit is a component of a USB hub or a USB power port controller. The power port control logic unit 300 controls the state of power switch 325 based on whether the current drawn on either USB port 350 or USB port 305 has triggered a current limit threshold. Both USB port 350 and USB port 305 are independently monitored to detect whether peripheral devices connected to these ports are drawing current in excess of a current limit threshold.

In the embodiment of FIG. 3, the current drawn by peripheral devices connected to either USB port 305 or USB port 350 is measured using a current sensing unit and a shunt resistor. More specifically, the current drawn on USB port 305 is measured by current sensing unit 320 and shunt resistor 310. The current sensing unit 320 calculates the current drawn on USB port 305 based on the measured voltage drop across shunt resistor 310. Another current sensing unit 340 and shunt resistor 345 similarly determine the current drawn on USB port 350. The current measurements generated by current sensing unit 320 are used to detect an over current condition on USB port 305 and the measurements generated by current sensing unit 340 are used to detect an over current condition on USB port 350.

In order to determine whether current limits have been exceeded in either of the USB ports, the current measurements made by the current sensing unit are compared to current limit values that have been individually specified for each of the USB ports. In some embodiments, a comparator component is used to determine whether the current limit of a USB port has been exceeded. In the embodiment of FIG. 3, comparator 330 receives the measured current drawn on USB port 305, as measured by current sensing unit 320. The comparator 330 evaluates the value of the measured current against a current limit setting stored in a register 315 that is associated with USB port 305. If the comparator 330 determines that the measured current exceeds the current limit setting for USB port 305, the comparator 330 signals this condition to the power port control logic unit 300. In response to the detection of this over-current condition on USB port 305, the port power control logic unit 300 then signals power switch 325 to shut off power supplied to both USB port 305 and USB port 350.

Power port control logic unit 300 similarly provides over-current protection based on current measurements made with respect USB port 350. A shunt resistor 345 and current sensing unit 340 are used to measure the current drawn on USB port 350. These current measurements are evaluated against a current limit setting for USB port 350 by comparator 335. Comparator retrieves a current limit setting for USB port 350 from register 355. Based on the current limit setting and the measured current, comparator 335 determines if an over-current condition is present in USB port 350. If an over-current condition is detected, comparator 335 relays this information to power port control logic unit 300. The same as for the detection of an over-current condition in USB port 305, the power port control logic unit 300 responds to the over-current condition in USB port 350 by signaling power switch 325 to shut off power supplied to both USB port 305 and USB port 350.

In this manner, the embodiment of FIG. 3 utilizes a single power switch 325 to implement over-current protection for multiple USB ports while utilizing current sensing measurements and determinations that are individualized to each USB port. By supporting current limit settings that can be tailored to individual USB ports, current limit evaluations can be made while minimizing stress on the USB connectors that comprise the USB ports. Consequently, the embodiment of FIG. 3 provides the cost benefit of a gang mode power switch while still providing the reduced stress and more narrowly tailored over-current protection offered by an individual mode power switch.

In some embodiments, the current limit for each USB port may be a fixed aspect of the comparator. The embodiment of FIG. 3 utilizes registers 315 and 355 to store current limit settings for detecting over-current conditions in USB port 305 and 350, respectively. These registers can be updated with updated current limit settings as needed. In some scenarios, the flexibility provided by these registers does not justify their extra cost. Instead, each comparator may instead utilize a fixed current limit setting. In other embodiments a single register may be used to store a single current limit setting that is used by all comparators. In some scenarios, the same current limit may be used for over-current protection on all USB ports. This single current limit can be stored in a central register that is accessed by each of the comparators.

Figure 4:
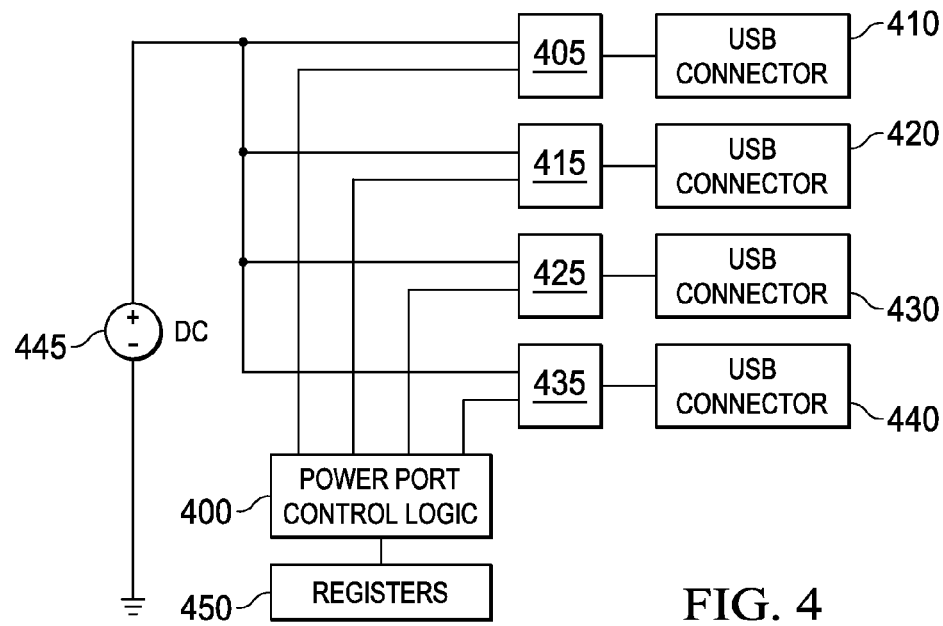
FIG. 4 is a schematic diagram illustrating the components of another power switch embodiment of the claimed invention.

FIG. 4 illustrates an embodiment that provides over-current protection to four ganged USB ports using a port power control logic unit that is configured to serve as a central evaluator of current limit thresholds. Independent current sensing is provided for each of the four ganged USB ports 410, 420, 430 and 440. As with the embodiment of FIG. 3, current sensing on the power lines of each of the USB ports is independently implemented using current sensing components such as a shunt resistor and an associated current sensing unit. The current drawn by a peripheral device connected to USB port 410 is determined by current sensing components 405. Current sensing is likewise independently implemented for each of the remaining USB ports. Each current sensing unit 405, 415, 425 and 435 output current measurements to a port power control logic unit 400.

Rather than utilize a power switch, the embodiment of FIG. 4 utilizes a dedicated switchable power supply 445 to provide power to the supported USB ports. As with the power switch of the embodiment of FIG. 3, the power supply 445 receives commands from power port control logic unit 400. If an over-current condition is detected by power port control logic unit 400, a command is dispatched ordering power supply 445 to shut off power to USB ports 410, 420, 430 and 440. Replacing the power switch with a dedicated power supply 445 is particularly useful in systems comprised of self-contained and separately-powered components, such as automotive electronics.

In the embodiment of FIG. 4, the port power logic control 400 unit is configured to serve as a comparator capable of evaluating whether current limit settings have been violated on any of the supported USB ports 410, 420, 430, or 440. Measurements made by the current sensing units 405, 415, 425, and 435 are provided to the power logic control unit 400 which then compares the measurements to current limit settings retrieved from a set of current limit registers 450. As with the embodiment of FIG. 3, each of the supported USB ports 410, 420, 430, or 440 will have a current limit stored in an associated register in the set of current limit registers 450. In addition, one or more additional registers may be present in the set of current limit registers 450 where these additional registers store current limits for evaluating the collective current draw by all the USB ports 410, 420, 430, or 440. The port power logic control unit 400 is configured to compare the received current measurements against the associated current limit setting retrieved from one of the current limit registers 450. If a current limit is violated, the port power control logic unit 400 signals the power supply 445 to shut off power to all USB ports.

Configured in this manner, the port power logic control unit is 400 capable of making current limit determinations regarding both individual USB ports and aggregate use by all supported USB ports. The port power logic control unit 400 is thus able to enforce current limits based on multiple conditions. The port power control logic unit 400 implements both the individualized over-current protection provided by individual mode power switching and the collective protection provided by gang mode power switching.

In some embodiments, the port power control logic will be further configured to serve as the current sensing unit, in addition to serving as a comparator. In such embodiments, a shunt resistor may still be used to obtain voltage measurements that can be used to calculate the current draw by an individual USB port. The voltage measurements associated with each shunt resistor are inputs to the port power control logic unit. In some embodiments an input multiplexer may be used, with the multiplexer inputs receiving pairs of voltage measurements for each of the shunt resistors. The multiplexer is further configured to retrieve the current limit that is applicable to each pair of shunt resistor readings from registers that store current limits for the individual USB ports. The multiplexer is further configured to output each pair of voltage measurements to an analog-to-digital converter (ADC) that is configured as a current sensing unit. The measurements made by the ADC and the retrieved current limits are then used by the port power control logic unit to make over-current determinations. As described above, a port power control logic unit that is configured in this manner is able to make individual over-current determinations for each USB port, as well as collective over-current determinations across all USB ports.

In some embodiments, USB ports can be divided into sub-groups, with each sub-group of USB ports sharing a single current sensing unit and a single comparator. In such instances, multiple USB ports can be protected collectively under a single current limit while remaining safely within the current ratings for the USB connectors used to implement each USB port. Each sub-group of USB ports is powered using a shared power rail. The current draw by an individual sub-group of USB ports is measured using a shunt resistor on power rail that is shared by the sub-group. For instance, in a modification of the embodiment of FIG. 4, current sensing components 405 might measure the current drawn on USB ports 410 and 420 and current sensing components 425 might measure the current draw on USB ports 430 and 440. The number of USB ports that may be ganged into such sub-groups can be determined according to the current ratings of the USB connectors.

According to the various embodiments, the measurements for each sub-group may be evaluated using a dedicated current sensing unit and comparator that retrieves a current limit for the subgroup from a register. For instance, in some embodiments, current sensing will be implemented using an ADC that is configured to make over-current determinations for each individual sub-group of USB ports. According to other embodiments, the current measurements for all sub-groups may be centrally evaluated by the port power control logic unit. As described, central over-current evaluation for all sub-groups of USB ports may be implemented using an ADC and input multiplexer. Grouping the USB ports in this manner provides the cost benefit of reducing the number of current sensing and comparator units while still ensuring that USB connectors are not subjected to potentially damaging currents.

What is claimed is:

1. A USB hub comprising a plurality of USB ports and further comprising:
   a power element providing a supply of current to the plurality of USB ports;
   a plurality of current measurement units, wherein each current measurement unit measures the current drawn by a USB port sub-group, wherein a USB port sub-group is comprised of one or more of the plurality of USB ports;
   a plurality of USB port sub-group registers, each USB port sub-group register storing a USB port sub-group current limit for a respective USB port sub-group;
   an aggregate USB port register configured to store an aggregate USB current limit for a total current drawn by all of the plurality of USB ports collectively; and
   a power port control system configured to:
      receive current measurements from the plurality of current measurement units;
      determine an aggregate current drawn by all of the plurality of USB ports collectively;
      perform a plurality of current limit evaluations, including:
         performing a USB port sub-group current limit evaluation for each respective USB port sub-group by comparing a current measurement received from a respective current measurement unit with the respective USB port sub-group current limit stored in the USB port sub-group register for the respective USB port sub-group;
         performing an aggregate USB port current limit evaluation for each respective USB port sub-group by comparing the total current drawn by all of the plurality of USB ports collectively with the aggregate USB current limit stored in the aggregate USB port register; and
      direct the power element to turn off the supply of current to the plurality of USB ports if any of the plurality of current limit evaluations, including any of the USB port sub-group current limit evaluation or the aggregate USB port current limit evaluation, indicates that any respective USB port sub-group or the aggregate USB current limit has been exceeded;
      wherein the power port control system includes a single switch configured to direct the power element to turn off the supply of current to the plurality of USB ports.

2. The USB hub according to claim 1, wherein the power element is a power switch or a controllable power supply.

3. The USB hub according to claim 1, wherein each of the current measurement units comprises a shunt resistor and a current sensing unit.

4. The USB hub according to claim 1, wherein the current measurement unit comprises an analog-to-digital converter.

5. A method for providing over-current protection comprising:
   providing a supply of current to a plurality of USB ports by a power supply element, the power supply including a single switch to shut off power to the USB ports;
   measuring the current drawn by each of a plurality of USB port sub-groups, wherein each USB port sub-group comprises one or more USB ports and wherein each USB port sub-group has an associated current measurement unit that measures the current drawn by the one or more USB ports associated with a USB port sub-group;
   receiving, by a power port control logic unit, the measured current drawn by each of the plurality of USB port sub-groups; and
   summing, by the power port control logic unit, the received measured current drawn by each USB port sub-group to determine an aggregate current drawn by all USB port sub-groups collectively; and
   retrieving a USB port sub-group current limit from a plurality of USB port sub-group registers, each USB port sub-group current limit indicating a current limit for a respective USB port sub-group;
   retrieving an aggregate USB current limit from an aggregate USB port register, the aggregate USB current limit indicating a current limit for an aggregate current drawn by all USB port sub-groups collectively;
   perform a plurality of current limit evaluations, including:
      performing a USB port sub-group current limit evaluation for each respective USB port sub-group by comparing the measured current drawn by each respective USB port sub-group with the respective USB port sub-group current limit retrieved from the respective USB port sub-group register;
      performing an aggregate USB port current limit evaluation by comparing the aggregate current drawn by all USB port sub-groups collectively with the aggregate USB current limit retrieved from the aggregate USB port register; and
   directing, by the power port control logic unit, the power supply element to shut off the supply of current to all of USB port sub-groups if any of the plurality of current limit evaluations, including any of the USB port sub-group current limit evaluation or the aggregate USB port current limit evaluation, indicates that any respective USB port sub-group or the aggregate USB current limit has been exceeded.

6. The method according to claim 5, wherein the power element is a power switch or a controllable power supply.

7. The method according to claim 5, wherein each of the current measurement units comprises a shunt resistor and a current sensing unit.

8. The method according to claim 5, wherein the current measurement unit comprises an analog-to-digital converter.

* * * * *